United States Patent [19]

Wachtel

[11] 4,024,096
[45] May 17, 1977

[54] JET PRINTING INK COMPOSITION FOR GLASS

[75] Inventor: Joseph Wachtel, Buffalo Grove, Ill.

[73] Assignee: A. B. Dick Company, Niles, Ill.

[22] Filed: July 7, 1975

[21] Appl. No.: 593,757

[52] U.S. Cl. .................................. 260/29.3; 106/22
[51] Int. Cl.$^2$ ........................................ C08G 51/24
[58] Field of Search ...................... 260/29.3; 106/22

[56] References Cited

UNITED STATES PATENTS

| | | | |
|---|---|---|---|
| 2,162,331 | 6/1939 | Ellis | 260/29.3 |
| 2,537,531 | 1/1951 | Hoyt | 260/29.3 |
| 2,556,902 | 6/1951 | Chambers | 260/29.3 |

OTHER PUBLICATIONS

Condensed Chem. Dictionary, Van Nostrand–Reinhold, 1966, (p. 782).

*Primary Examiner*—Theodore E. Pertilla
*Attorney, Agent, or Firm*—McDougall, Hersh & Scott

[57] ABSTRACT

An ink composition for printing onto the surfaces of glass or other glazed ceramic surfaces by jet printing in which the preferred formulation for the printing ink composition comprises 2 – 20% by weight of a linear novolac resin, 0.6 – 3% by weight of an alcohol or water and alcohol soluble dyestuff, 3 – 7% by weight of an evaporation retardant in the form of a glycol ether or glycol ester, with the remainder water and alcohol, with the water present in an amount up to 50% by weight of the alcohol and which may contain a soluble ionizable salt when the electrical resistivity of the ink composition exceeds 2000 ohm/cm.

11 Claims, No Drawings

JET PRINTING INK COMPOSITION FOR GLASS

This invention relates to printing ink compositions adapted for use in printing with a jet printer onto glass or other glazed ceramic surfaces.

There are a number of problems that must be faced in the development of a suitable ink composition for use in jet printing onto glass or other glazed ceramic surfaces. In the first instance, the ink composition must embody a number of clearly defined characteristics, as hereinafter set forth, in order to enable use in a jet printing process.

|  | Broad range | Preferred range |
|---|---|---|
| Viscosity (20° C) CPS | 1.0 – 8.0 | 1.5 – 4.5 |
| Electrical resistivity ohm-cm | <3000 | <2000 |
| Surface tension dynes/cm | 22.5 – 60 | 23.5 – 32 |
| Sonic viscosity meters/sec | 1200 – 1800 | 1200 – 1600 |
| Specific gravity | .800 – 1.045 | .850 – .950 |

In addition to the above specification for a suitable jet printing ink, the ink composition should be formulated to provide a stable system which avoids precipitation during storage and use, since any such precipitates raise problems in printing, as by clogging the ink jet orifices and the ink return orifices in the jet printer and reduction in strength of the printed image.

Another problem in the formulation of an ink composition of the type described arises from the difficulty of establishing a strong bonded relation between the ink and the surfaces of the glass or other glazed ceramic whereby a strong bond will develop almost immediately upon the drying of the applied ink composition, sufficient to resist removal during washing with a flowing water stream or spray within a few seconds after printing, yet be completely removable when washed with a mild caustic solution, such as used in the washing of beverage bottles; which resist dry rubbing and moderate rubbing when wet. These problems arise, in part, from the highly hydrophilic characteristics on the glass or ceramic surfaces, as compared to the highly hydrophobic characteristics of the organic binders usually employed in the formulation of the ink composition, coupled with the difficulty in establishing a physical bond with the perfectly smooth, non-porous surfaces on the glass or other glazed ceramic.

In order to achieve a desirable balance of glass adhesion and ink stability, it has been proposed to formulate the printing ink composition of an acid catalyzed phenol-aldehyde resin, often referred to as novolac resin, which is alcohol soluble and at least water dilutable and which therefore enables the inclusion of water in the printing ink composition believed to be desirable for maintaining the stability of the ink composition. The formulated ink composition included an organo silicon compound in the form of an organo silane which operated to promote the adhesion of the printing ink containing the novolac resinous binder to the glass or ceramic surfaces thereby to achieve the preferential bond of the printed image.

Such printing ink compositions have not supplied a complete answer to the problem since such novalac resinous binders and organo silane, when employed in admixture with triarylmethane dyestuffs or with alcohol and water solvent, experienced undesirable precipitation and improper drying rates. The use of alcohol solutions with low amounts of water, as diluent, raised drying problems and rapid clogging of the printing ink return orifices in the jet printer.

Thus it is an object of this invention to produce an ink composition which is suitable for use in printing onto glass or other ceramic surfaces with a jet printer; which develops enough adhesion to glass to resist washing off by a flowing water stream or spray and still remain easily removable from the glass surfaces by aqueous wash solution containing a mild caustic; which develops adhesion to glass within a few seconds, and in which the adhesion is sufficient, after aging, to resist a dry ink rub and a mild wet rub test; which is more tolerant to dyestuffs thereby to enable a wider selection of dye colors for the printing ink as well as a possible higher concentration of dyestuffs for development of a more intense image, and which is substantially free of precipitation and clogging of the ink jets or orifices.

The ink composition of this invention is still based upon the use of a novalac resinous binder. These are acid catalyzed condensation reaction products of phenol and an aldehyde, preferably formaldehyde or paraformaldehyde, which, by reason of the condensation reaction on the acid side, yields a low molecular weight linear polymer which remains soluble in alcohol and alcohol and water and at least dilutable with water because of its linear construction, and freedom of crosslinkages.

Preparation of novalac resins, suitable for use in the practice of this invention, are well known to the skilled in the art, and are commercially available as from Schnectady Varnish Company under the trade names FRJ-425 (molecular weight 750) and FRJ-508 (molecular weight 500). In the formulation of the jet printing ink composition of this invention, novalac resinous materials having an average molecular weight within the range of 200 to 2500, and peferably 400 to 1000, can be used in an amount within the range of 1–30% by weight, and preferably in an amount within the range of 2–20% by weight of the ink composition.

The dyestuffs are employed in the ink composition of this invention in an amount sufficient to give the desired color intensity, usually in a concentration within the range of 0.4 – 5% by weight, and preferably 0.6 – 3% by weight of the ink composition. The following is a partial list of the dyestuffs which can be used in ink compositions embodying the features of this invention. As indicated in the following tabulation, most of the inks are of the solvent soluble or water and solvent soluble types.

| Basic Violet 10 | Water and solvent soluble. |
|---|---|
| Basic Blue 81 | Solvent soluble. |
| Acid Red 52 | Water and solvent soluble. |
| Acid Black 1 | Water and solvent soluble. |
| Acid Blue 59 | Water and solvent soluble. |
| Acid Red 73 | Water and solvent soluble. |
| Acid Blue 9 | Water and solvent soluble. |
| Solvent Orange 7 | Solvent soluble. |
| Solvent Blue 58 | Solvent soluble. |

Undesirable features in jet printing inks of the types previously described have been overcome by the elimination of the organo silicon component and the inclusion of an evaporation retardant which is wholly compatible with the other ingredients of the ink composition and which enhances the control of the drying rate without interfering with the adhesion or rate of development of adhesion of the printed ink image on the glazed ceramic surface. Although such evaporation retardant is not essential to the printing ink composition of this invention, beneficial use of such evaporation retardant can be made in amounts ranging from 0 to 20% by weight of the ink composition, and preferably in an amount within the range of 3 to 7% by weight of the ink composition. Evaporation retardants are represented by members of the group of glycol ethers and esters, such as ethylene glycol monomethyl ether, ethylene glycol dimethyl ether, ethylene glycol monoethyl ether, ethylene glycol diethyl ether, ethylene glycol monobutyl ether, ethylene glycol monophenol ether, ethylene glycol mono-2-ethylbutyl ether, diethylene glycol monomethyl ether, diethylene glycol monoethyl ether, ethylene glycol monomethyl ether acetate, ethylene glycol monoethyl ether acetate, and diethylene glycol monomethyl ether acetate.

Both water and alcohol are used as the liquid carrier with the water present in an amount up to 80% by weight, and preferably in an amount up to 50% by weight of the alcohol. As the alcohol, use can be made of any low boiling, fast drying alcohol, such as methanol, ethanol, propanol, isopropanol and other $C_1$ to $C_5$ alcohols.

The following are representative of jet printing ink compositions embodying the features of this invention.

Example 1

| | % by weight |
|---|---|
| novolac resin (Schnectady Varnish Co. FRJ-425) | 5.8 |
| Methanol | 66.2 |
| Water (distilled) | 20.0 |
| Ethylene glycol monoethyl ether | 5.0 |
| Diethylene glycol monoethyl ether | 1.5 |
| Basic Violet 10 | 1.5 |

Example 2

| | % by weight |
|---|---|
| novolac resin (Schnectady Varnish Co. FRJ-425) | 6.0 |
| Methanol | 66.0 |
| Water (distilled) | 20.0 |
| Ethylene glycol monoethyl ether | 5.0 |
| Diethylene glycol monoethyl ether | 1.5 |
| Acid Red 52 | 1.5 |

Example 3

| | % by weight |
|---|---|
| novolac resin (Schnectady Varnish Co. FRJ-508) | 7.0 |
| Ethanol | 52.5 |
| Water (distilled) | 34.0 |
| Ethylene glycol monoethyl ether | 5.0 |
| Diethylene glycol monoethyl ether | 1.5 |
| Basic Blue 81 | 1.0 |

The above are examples of ink compositions wherein use is made of a water and alcohol soluble dyestuff, either basic or acid. When use is made of an alcohol soluble dyestuff, which does not tolerate the amount of water as in Examples 1 to 3, it is desirable to increase the amount of evaporation retardant to maintain stability and a proper drying rate, as illustrated by the following Example:

Example 4

| | % by weight |
|---|---|
| novolac resin (Schenectady Varnish Co. FRJ-425) | 5.8 |
| Methanol | 25.0 |
| Ethanol | 51.2 |
| Water | 5.0 |
| Ethylene glycol monoethyl ether | 10.0 |
| Diethylene glycol monoethyl ether | 1.5 |
| Solvent Orange 7 | 1.5 |

In order to avoid increase in electrical resistivity of the ink composition above the allowable limit for use in a jet printer, by reason of the formulation of the ink composition with a dyestuff that does not contain sufficient ionic material and/or the use of a lower amount of water, the deficiency can be made up by the addition to the ink composition of a highly ionizable salt, such as an alkali metal thiocyanate or similar salt to reduce the resistance, as illustrated by the following example which defines the parameters of the ink composition of this invention from the standpoint of essential ingredients and their amounts in the preferred and broad ranges:

Example 5

| | Broad Range | Narrow Range |
|---|---|---|
| Linear novolac | 1 – 30% | 2 – 20% |
| Soluble dyestuff | 0.4 – 5% | .6 – 3% |
| Evaporation retardants | 0 – 20% | 3 – 7% |
| Alcohol | Remainder | Remainder |
| Water | Up to 80% of the alcohol | Up to 50% of the alcohol |
| Potassium Thiocyanate | 0 – 1.5% | 0 – 1% |

The order for combining the ingredients is not important since the materials are taken into solution in forming the ink composition.

It will be understood that changes may be made in the details of formulation and operation without departing from the spirit of the invention, especially as defined in the following claims.

I claim:

1. An ink composition consisting essentially of
   1 – 30% by weight linear novolac resin
   0.4 – 5% by weight soluble dyestuff
   0 – 20% by weight evaporation retardant
   0 – 1.5% by weight alkali metal thiocyanate
   Remainder water and $C_1 - C_5$ alcohol, with the water present in an amount up to 80% by weight of the alcohol,
   said ink having a viscosity (20° C) within the range of 1.0 – 8.0 cps, an electrical resistivity of less than 3000 ohm-cm, surface tension of 22.5 – 60 dynes/cm, sonic viscosity within the range of 1200 – 1800 meters/sec. and a specific gravity within the range of 0.800 – 1.045.

2. An ink composition as claimed in claim 1 in which the materials are present in the amounts of
   2 – 20% by weight linear novolac resin
   0.6 – 3% by weight soluble dyestuff
   3 – 7% by weight evaporation retardant
   0 – 1% by weight alkali metal thiocyanate
   Remainder water and $C_1 - C_5$ alcohol, with the water present in an amount up to 50% by weight of the alcohol,
   said ink composition having a viscosity within the range of 1.5 – 4.5 cps at 20° C, an electrical resistivity of less than 2000 ohm-cm, surface tension within the range of 23.5 – 32, dynes/cm, sonic viscosity within the range of 1200 – 1600 meters/sec, and a specific gravity within the range of 0.850 – 0.950.

3. An ink composition as claimed in claim 1 in which the novolac resin is an acid catalyzed phenol formaldehyde resin.

4. An ink composition as claimed in claim 1 in which the novolac resin has an average molecular weight within the range of 200 to 2500.

5. An ink composition as claimed in claim 1 in which the novolac resin has an average molecular weight within the range of 400 to 1000.

6. An ink composition as claimed in claim 1 in which the dyestuff is an alcohol soluble or an alcohol and water soluble dyestuff.

7. An ink composition as claimed in claim 1 in which the alkali metal thiocyanate, when present, is potassium thiocyanate.

8. An ink composition for printing onto the surfaces of glass or other ceramic surfaces by jet printing in which the ink composition consists essentially of 1 – 30% by weight of a linear novolac resin
0.4 – 5% by weight of a solvent soluble or water and alcohol soluble dyestuff
0 – 20% by weight of an evaporation retardant
Remainder water and $C_1$-$C_5$ alcohol, with the water present in an amount up to 80% by weight of the alcohol, and which includes an ionizable salt present in an amount up to 0.15% by weight when the electrical resistivity of the ink composition exceeds 2000 ohm-cm.

9. An ink composition as claimed in claim 8 in which the linear novolac resin is present in an amount within the range of 2 – 20% by weight, the soluble dyestuff is present in an amount within the range of 0.6 – 3% by weight, the evaporation retardant is present in an amount within the range of 3 – 7% by weight and the water is present in an amount up to 50% by weight of the alcohol.

10. An ink composition as claimed in claim 8 in which the evaporation retardant is selected from the group consisting of a glycol ether and a glycol ester.

11. An ink composition as claimed in claim 10 in which the evaporation retardant is selected from the group consisting of ethylene glycol monoethyl ether and diethylene glycol monoethyl ether.

* * * * *